(12) United States Patent
Zhang et al.

(10) Patent No.: US 12,534,930 B2
(45) Date of Patent: Jan. 27, 2026

(54) SWIMMING POOL CLEANING SYSTEM AND CONTROL METHOD THEREOF

(71) Applicants: Best Epoch Technology Co. LTD, Shenzhen (CN); UBTECH ROBOTICS CORP LTD, Shenzhen (CN)

(72) Inventors: Hua Zhang, Shenzhen (CN); Zhijian Liang, Shenzhen (CN); Xiangyu Zeng, Shenzhen (CN)

(73) Assignees: BEST EPOCH TECHNOLOGY CO. LTD, Shenzhen (CN); UBTECH ROBOTICS CORP LTD, Shenzhen (CN)

( * ) Notice: Subject to any disclaimer, the term of this patent is extended or adjusted under 35 U.S.C. 154(b) by 34 days.

(21) Appl. No.: 18/896,904

(22) Filed: Sep. 26, 2024

(65) Prior Publication Data

US 2025/0215716 A1    Jul. 3, 2025

(30) Foreign Application Priority Data

Dec. 28, 2023  (CN) .......................... 202311852759.8

(51) Int. Cl.
*E04H 4/16*    (2006.01)
*G06F 3/02*    (2006.01)
*G10L 15/22*   (2006.01)

(52) U.S. Cl.
CPC ............. *E04H 4/1654* (2013.01); *G06F 3/02* (2013.01); *G10L 15/22* (2013.01); *G10L 2015/223* (2013.01)

(58) Field of Classification Search
CPC ......... E04H 4/1654; G06F 3/02; G10L 15/22; G10L 2015/223
See application file for complete search history.

(56) References Cited

U.S. PATENT DOCUMENTS

| | | | |
|---|---|---|---|
| 6,485,638 B2* | 11/2002 | Henkin | E04H 4/1654 210/167.16 |
| 9,779,842 B2* | 10/2017 | Strohmayer | G21F 9/34 |
| 9,791,840 B2* | 10/2017 | Michelon | E04H 4/1654 |
| 10,107,000 B2* | 10/2018 | Barcelos | G05D 1/0242 |
| 11,306,500 B2* | 4/2022 | Pichon | H04N 23/90 |
| 11,753,840 B1* | 9/2023 | Zhong | E04H 4/1636 15/1.7 |
| 11,767,679 B2* | 9/2023 | Braidic | G05D 1/0246 15/1.7 |
| 12,173,524 B2* | 12/2024 | Pichon | H04N 23/90 |
| 2001/0032809 A1* | 10/2001 | Henkin | E04H 4/1654 210/97 |
| 2006/0223394 A1* | 10/2006 | Porat | E04H 4/1654 441/136 |
| 2007/0067930 A1* | 3/2007 | Garti | E04H 4/1654 15/1.7 |

(Continued)

*Primary Examiner* — Ramsey Refai

(57) ABSTRACT

A swimming pool cleaning system includes: a pool cleaning robot (10) that is to at least clean a floor and pool walls of a swimming pool; and a surface cleaning device (20) that is to at least clean a pool surface of the swimming pool. The surface cleaning device (20) is wirelessly connectable to an external control device and has a connecting cable (21) that electrically connects the surface cleaning device (20) to the pool cleaning robot (10), so that the pool cleaning robot (10) communicates with the external control device via the surface cleaning device (20).

13 Claims, 16 Drawing Sheets

(56) References Cited

U.S. PATENT DOCUMENTS

| | | | |
|---|---|---|---|
| 2009/0282627 A1* | 11/2009 | Porat | G06Q 20/3255 |
| | | | 204/229.4 |
| 2014/0263087 A1* | 9/2014 | Renaud | E04H 4/1654 |
| | | | 210/745 |
| 2016/0148711 A1* | 5/2016 | Strohmayer | E02F 3/8833 |
| | | | 15/1.7 |
| 2019/0284827 A1* | 9/2019 | Witelson | E04H 4/1654 |
| 2022/0137599 A1* | 5/2022 | Hayes | G05D 1/43 |
| | | | 700/28 |

* cited by examiner

SWIMMING POOL CLEANING SYSTEM AND CONTROL METHOD THEREOF

CROSS REFERENCE TO RELATED APPLICATIONS

This application claims priority to Chinese Patent Application No. CN 202311852759.8, filed Dec. 28, 2023, which is hereby incorporated by reference herein as if set forth in its entirety.

TECHNICAL FIELD

The present disclosure generally relates to robots, and in particular relates to a swimming pool cleaning system and control method of controlling the same.

BACKGROUND

With the development of technology, robotics has rapidly advanced. For example, users utilize robot vacuums for cleaning the floors of their homes, window-cleaning robots for cleaning house windows, and pool-cleaning robots for cleaning swimming pools.

In conventional pool-cleaning robots, wireless communication is established between the pool-cleaning robot and the control equipment onshore, allowing users to control the robot via the onshore control device to perform cleaning tasks. However, when the pool-cleaning robot operates at the floor of the pool, the wireless communication signal is severely attenuated due to transmission through water, resulting in an inability to establish a stable connection between the pool-cleaning robot and the onshore control equipment. Consequently, users are unable to control the robot, leading to a poor user experience.

Therefore, there is a need to provide a swimming pool cleaning system to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
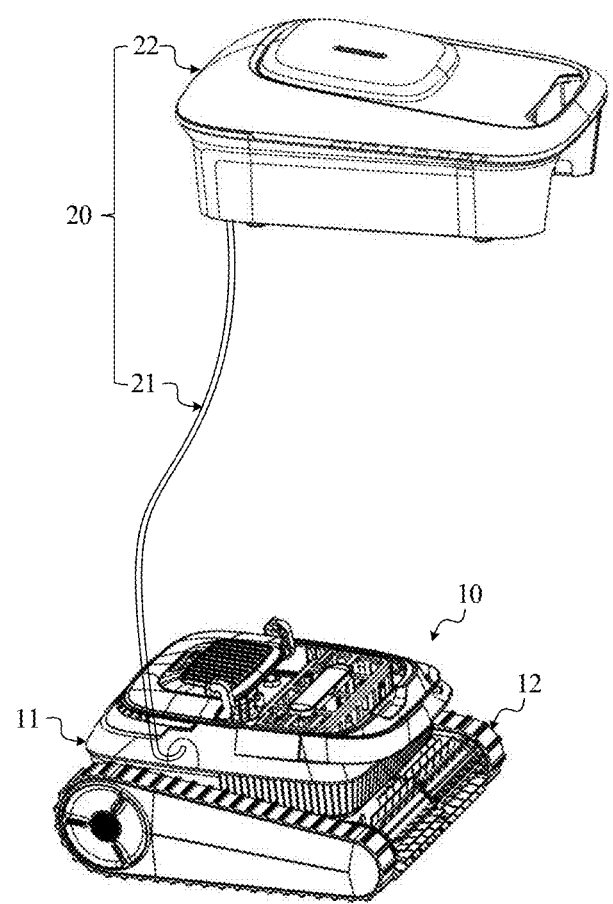
FIG. 1 is a schematic diagram of a swimming pool cleaning system according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

In conventional pool-cleaning robots, wireless communication is established between the pool-cleaning robot and the control equipment onshore, allowing users to control the robot via the onshore control device to perform cleaning tasks. However, when the pool-cleaning robot operates at the floor of the pool, the wireless communication signal is severely attenuated due to transmission through water, resulting in an inability to establish a stable connection between the pool-cleaning robot and the onshore control equipment. Consequently, users are unable to control the robot, leading to a poor user experience.

To solve the above problem, the present disclosure provides a pool cleaning system and its control method. The pool cleaning system includes a pool cleaning robot and a surface cleaning device. The pool cleaning robot is connected to the surface cleaning device via a connecting cable, enabling the robot to communicate with external control device through the surface cleaning device. This configuration avoids severe signal attenuation during wireless communication transmission, ensuring stable communication between the pool cleaning robot and the external control device, and preventing delays when the robot responds to commands from the external device. This improves the response speed of the pool cleaning robot. Moreover, since the pool cleaning robot is connected to the surface cleaning device via the connecting cable, during the cleaning process, the pool cleaning robot can serve as the power source for the surface cleaning device, driving the surface cleaning device to clean the surface of the pool. This allows the system to simultaneously meet the cleaning needs of both the water surface and the pool's floor and walls, thereby improving the working efficiency of the pool cleaning system and shortening the cleaning time.

Referring to FIG. 1, in one embodiment, a pool cleaning system may include a pool cleaning robot 10 and a surface cleaning device 20. The pool cleaning robot 10 is used for cleaning at least the floor and walls of the pool. The surface cleaning device 20 is used for cleaning at least the surface of the pool. The surface cleaning device 20 is wirelessly connected to an external control device. Additionally, the surface cleaning device 20 includes a connecting cable 21, which connects the surface cleaning device 20 to the pool cleaning robot 10. This allows the pool cleaning robot 10 to communicate with the external control device through the surface cleaning device 20.

In one embodiment, the pool cleaning robot 10 can further be used to clean the waterline of the pool.

In one embodiment, as shown in FIG. 1, one end of the connecting cable 21 is connected to the bottom surface of the surface cleaning device 20, while the other end of the connection cable 21 is connected to the side of the pool cleaning robot 10. Alternatively, one end of the connecting cable 21 can be connected to the side of the surface cleaning device 20, and the other end can be connected to the top surface of the pool cleaning robot 10. This embodiment does not impose specific restrictions on the connection positions between the connecting cable 21 and the surface cleaning device 20, or between the connecting cable 21 and the pool cleaning robot 10.

Figure 2:
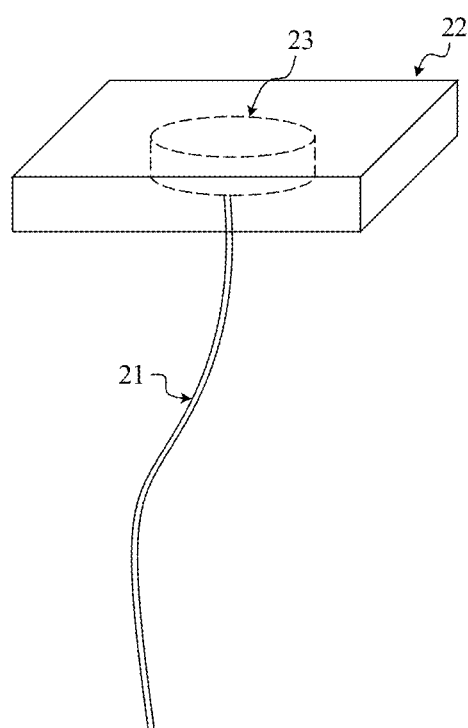
FIG. 2 is a schematic diagram of a surface cleaning device according to one embodiment.

Referring to FIG. 2, in one embodiment, the surface cleaning device 20 can include a first cleaning body 22 and a communication device 23. The communication device 23 is detachably connected to the first cleaning body 22. One end of the connection cable 21 is connected to the communication device 23, while the other end is connected to the pool cleaning robot 10. Exemplarily, the first cleaning body 22 may define a chamber (not shown), and the communication device 23 can be arranged within the chamber of the first cleaning body 22. When the communication device 23 is located within the chamber of the first cleaning body 22, one end of the connection cable 21 is connected to the communication device 23, and the other end extends out of the first cleaning body 22 to connect to the pool cleaning robot 10.

Figure 3:
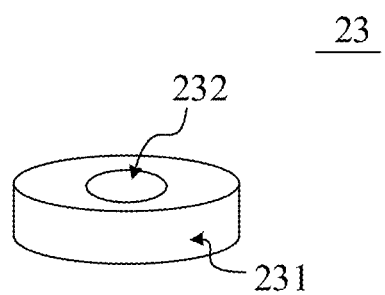
FIG. 3 is a schematic diagram of a communication device according to one embodiment.

Referring to FIGS. 2 and 3, in one embodiment, the communication device 23 can include a first housing 231 and a communication module 232. The first housing 231 floatable on the water surface. The communication module 232 is located within the first housing 231 and wirelessly communicates with the external control device. Specifically, one end of the connecting cable 21 is connected to the communication module 232, while the other end extends out of the first housing 231 and is connected to the pool cleaning robot 10.

In one embodiment, the connection cable 21 can be detachably connected to the communication device 23, meaning that the connecting cable 21 can be detachably connected to the communication module 232. Specifically, the connecting cable 21 may include at least one first interface. Through this first interface, a communication connection can be established between the pool cleaning robot 10 and the communication device 23, that is, between the pool cleaning robot 10 and the surface cleaning device 20.

In one embodiment, the surface cleaning device 20 can establish a Bluetooth or Wi-Fi wireless connection with the external control device. Through the communication device 23, the pool cleaning robot 10 can establish a Bluetooth or Wi-Fi wireless connection with the external control device.

In other words, the pool cleaning robot 10 and the surface cleaning device 20 can work simultaneously or independently. In one embodiment, when the pool cleaning robot 10 and the surface cleaning device 20 are working simultaneously, the communication device 23 is arranged within the surface cleaning device 20. The pool cleaning robot 10 can be connected to the surface cleaning device 20 via the connecting cable 21. This way, the external control device can send control commands to the pool cleaning robot 10 through the communication device 23 and the connecting cable 21, allowing it to clean the floor and walls of the pool. At the same time, when the pool cleaning robot 10 moves, it can drive the surface cleaning device 20 to move, enabling the surface cleaning device 20 to clean the water surface.

Figure 4:
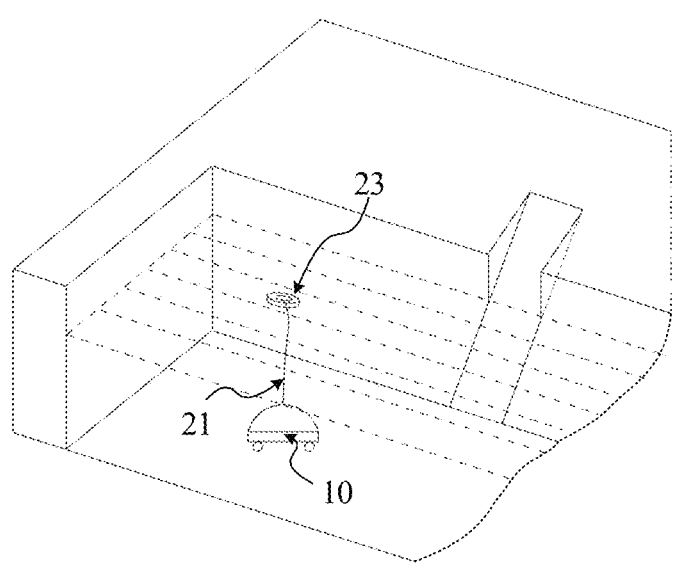
FIG. 4 is the schematic diagrams of a first application scenarios of the swimming pool cleaning system.

In one embodiment, the pool cleaning robot 10 can operate independently. As shown in FIG. 4, the pool cleaning robot 10 is connected to the communication device 23 via the connecting cable 21. The pool cleaning robot 10 can communicate with the external control device through the communication device 23, which floats on the water surface. The external control device can then send control commands to the pool cleaning robot 10 to control it for cleaning the floor and walls of the pool.

It should be noted that the part concerning the independent operation of the surface cleaning device 20 will be explained in conjunction with the composition of the surface cleaning device 20 in the following sections. To avoid repetition, it will not be elaborated here.

In the pool cleaning system provided in the present disclosure, the pool cleaning robot 10 is connected to the surface cleaning device 20 via a connecting cable 21. This allows the pool cleaning robot 10 to communicate with the external control device through the surface cleaning device 20, preventing severe attenuation of the wireless communication signal during transmission. It ensures stable communication between the pool cleaning robot 10 and the external control device, avoiding delays when the pool cleaning robot 10 responds to commands from the external control device, thereby improving the response speed of the pool cleaning robot 10.

Moreover, since the pool cleaning robot 10 is connected to the surface cleaning device 20 via the connecting cable, during the cleaning process, the pool cleaning robot 10 can serve as the power source for the surface cleaning device 20, driving it to clean the water surface. This configuration simultaneously meets the cleaning needs of both the water surface and the pool's floor and walls, improving the working efficiency of the pool cleaning system and reducing the cleaning time.

Additionally, in one embodiment, the pool cleaning robot 10 can work by directly connecting to the communication device 23, and the surface cleaning device 20 can carry the communication device 23 and operate independently. In other words, the pool cleaning system can offer multiple working modes, making it adaptable to different cleaning scenarios. This allows the system to meet various cleaning needs of the user, providing more flexibility and enhancing the user experience.

The following provides an illustrative explanation of the pool cleaning robot 10 with specific examples.

Figure 5:
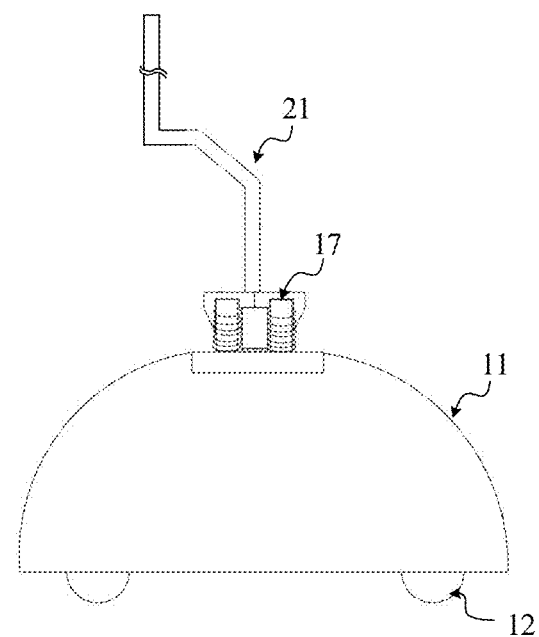
FIG. 5 is a schematic diagram of a swimming pool cleaning robot according to one embodiment.
Figure 6:
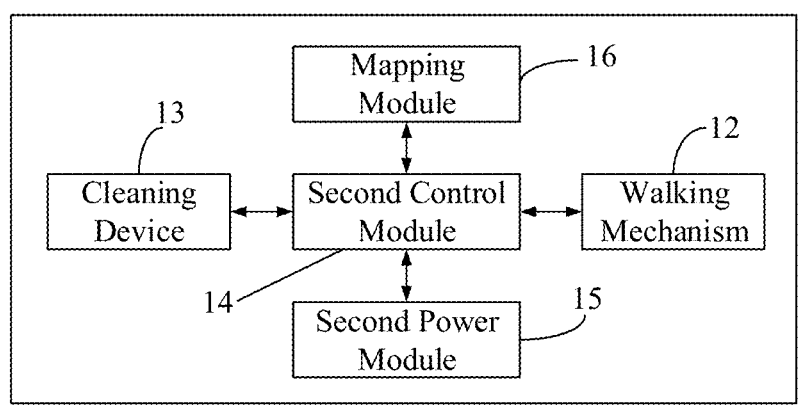
FIG. 6 is a schematic block diagram of the pool cleaning robot according to one embodiment.

In one embodiment, as shown in FIGS. 1, 5, and 6, the pool cleaning robot 10 may include a third housing 11, a walking mechanism 12, a cleaning device 13, a second control module 14, and a second power module 15. The second control module 14 is arranged inside the third housing 11 and is connected to the surface cleaning device 20 through the connecting cable 21. This allows the second control module 14 to communicate with the external control device via the surface cleaning device 20, enabling it to receive control commands sent by the external control device. The walking mechanism 12 is installed at the bottom of the third housing 11, and the second control module 14 is connected to both the walking mechanism 12 and the cleaning device 13. The second control module 14 can control the walking mechanism 12 and the cleaning device 13 based on the received control commands, meaning it can direct the walking mechanism 12 to move the pool cleaning robot 10 within the working area and control the cleaning device 13 to clean the floor and walls of the pool. The second power module 15 is connected to the walking mechanism 12, the cleaning device 13, and the second control module 14, providing power to all these components.

In one embodiment, as shown in FIG. 5, the walking mechanism 12 may include an actuation mechanism and walking wheels. The actuation mechanism can rotate the walking wheels, thereby moving the pool cleaning robot 10 within the working area. As shown in FIG. 1, the walking mechanism 12 can be a track-type walking wheel. The track-type walking wheel allows the pool cleaning robot 10 to move along the floor of the pool. In wall-climbing mode, it can drive the robot to climb from the floor of the pool to the pool wall and move along the wall, thus enabling the cleaning of both the pool floor and walls. This embodiment does not impose limitations on the specific structure of the walking mechanism 12 of the pool cleaning robot 10.

In one embodiment, as shown in FIG. 5, the pool cleaning robot 10 further includes an electrical connector 17, which can be located on the top of the third housing 11. The pool cleaning robot 10 is connected to the connecting cable 21 through the electrical connector 17. By controlling the signal input to the electrical connector 17, the pool cleaning robot 10 can either connect to or disconnect from the connecting cable 21, meaning it can electrically connect to or disconnect from the surface cleaning device 20. Specifically, when the signal input to the electrical connector 17 is a first electrical signal, the pool cleaning robot 10 connects to the connecting cable 21; when the signal is a second electrical signal, the pool cleaning robot 10 disconnects from the connection cable 21.

In one embodiment, the electrical connector 17 can be an electromagnetic induction connector. The electromagnetic induction connector is electrically connected to the second control module 14. When the second control module 14 powers the electromagnetic induction connector (i.e., when the signal input to the electromagnetic induction connector is the first electrical signal), the connector generates a magnetic force and connects to the connection cable 21. Conversely, when the second control module 14 cuts power to the electromagnetic induction connector (i.e., when the signal input to the electromagnetic induction connector is the second electrical signal), the connector loses its magnetic force and disconnects from the connection cable 21. This allows for the connection and disconnection of the pool cleaning robot 10 from the connecting cable 21, and consequently, the connection and disconnection of the pool cleaning robot 10 from the surface cleaning device 20.

More specifically, the second control module 14 can control the power on or off of the electromagnetic induction connector based on the control commands sent by the external control device, thereby controlling the connection or disconnection of the pool cleaning robot 10 from the connecting cable 21. For example, when the second control module 14 receives a charging command from the external control device, it will control the electromagnetic induction connector to cut power, causing the pool cleaning robot 10 to disconnect from the connecting cable 21. This allows the pool cleaning robot 10 to return to the charging station for recharging. After the pool cleaning robot 10 has completed charging, the external control device can send a cleaning command to the pool cleaning robot 10. Upon receiving the cleaning command, the second control module 14 will control the electromagnetic induction connector to power on, enabling the pool cleaning robot 10 to move near the connecting cable 21 and connect to it using the magnetic force generated by the electromagnetic induction connector.

The pool cleaning robot 10 connects to the connecting cable 21 through the electrical connector 17, which in turn connects to the surface cleaning device 20. By changing the electrical signal input to the electrical connector 17, the connection and disconnection between the electrical connector 17 and the connecting cable 21 can be controlled. This, in turn, allows for controlling the connection and disconnection between the pool cleaning robot 10 and the surface cleaning device 20. Consequently, when the pool cleaning robot 10 performs certain actions, the electrical connector 17 can control the disconnection of the pool cleaning robot 10 from the connecting cable 21, preventing the cable from affecting the movement of the pool cleaning robot 10 and avoiding any mutual interference between the pool cleaning robot 10 and the surface cleaning device 20.

In one embodiment, as shown in FIG. 6, the pool cleaning robot 10 may include a mapping module 16. The mapping module 16 can collect size information of the working area and, based on this information, generate a map of the working area. Exemplarily, the mapping module 16 can be a laser vision module, a gyroscope, or an optical flow sensor. The size information of the working area can include the length and width of the pool floor, as well as the length (or width) and height of the pool walls.

Figure 7:
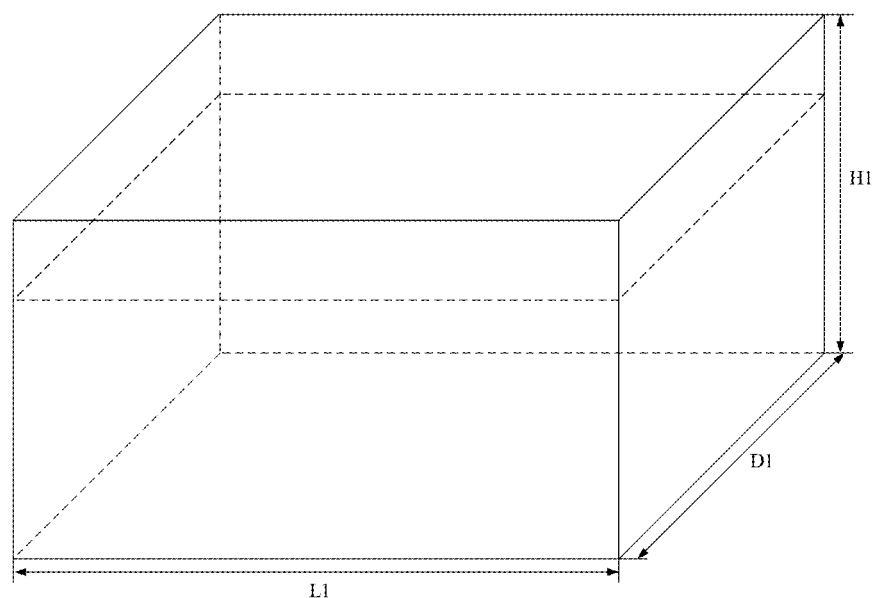
FIG. 7 is a schematic diagram of the working area of pool cleaning system.

For example, as shown in FIG. 7, the pool includes the pool floor, the first pool wall, the second pool wall, the third pool wall, and the fourth pool wall. The pool cleaning robot 10 is controlled to move along the lengthwise direction of the pool floor, and the mapping module determines whether the pool cleaning robot 10 has reached the pool wall, thereby obtaining the length information of the pool floor (i.e., L1). The pool cleaning robot 10 is then controlled to move along the widthwise direction of the pool floor, and the mapping module determines whether the pool cleaning robot 10 has reached the pool wall, thereby obtaining the width information of the pool floor (i.e., D1). The pool cleaning robot 10 is then controlled to climb from the floor to the pool wall and collect the height information of the wall (H1). After that, based on the length information of the pool floor (i.e., L1), the width information of the pool floor (i.e., D1), and the height information of the pool wall (i.e., H1), the size information of the first pool wall (width=D1, height=H1), the second pool wall (length=L1, height=H1), the third pool wall (width=D1, height=H1), and the fourth pool wall (length=L1, height=H1) can be obtained. Then, based on the length information (L1) and width information (D1) of the pool floor, the first map is constructed. Based on the size information of the first, second, third, and fourth pool walls, a second map is constructed, which includes a first sub-map corresponding to the first pool wall, a second sub-map corresponding to the second pool wall, a third sub-map corresponding to the third pool wall, and a fourth sub-map corresponding to the fourth pool wall. By stitching together the first map, the first, second, third, and fourth sub-maps, a three-dimensional map of the pool is obtained.

Additionally, in one embodiment, the mapping module 16 can further generate map information for the pool's water surface based on the first map, the first sub-map, the second sub-map, the third sub-map, and the fourth sub-map, thereby creating a third map. For instance, the mapping module 16 can send the first map, the first sub-map, the second sub-map, the third sub-map, and the fourth sub-map to the external control device. The external control device can then generate map information of the pool's water surface based on these maps, thereby obtaining the third map.

In one embodiment, after the mapping module 16 of the pool cleaning robot 10 generates the map information for the work area (the three-dimensional map of the pool and the map information of the pool's water surface), the mapping module 16 sends the map information of the work area to the surface cleaning device 20 through the connecting line 21. The surface cleaning device 20 then transmits the work area map information to the external control device, allowing the external control device to display the map information of the work area. This enables the user to select a target area based on the map information and send control commands to the pool cleaning robot 10 to clean the selected target area. For example, the user can control the pool cleaning robot 10 to clean the floor of the pool; or, the user can control the robot to clean specific sections of the pool floor. Additionally, the user could control the pool cleaning robot 10 to clean the first pool wall.

The following section provides an illustrative explanation of the surface cleaning device 20 through specific examples.

Figure 8:
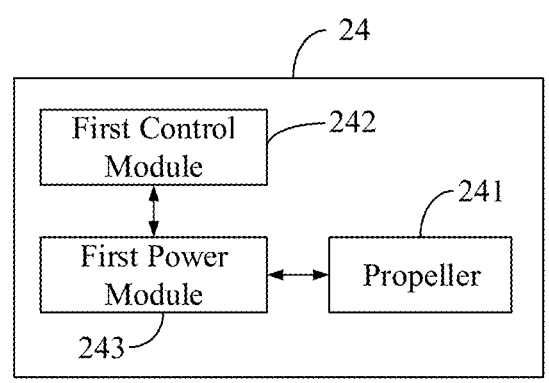
FIG. 8 is a schematic block diagram of a power module according to one embodiment.

In one embodiment, as shown in FIGS. 2 and 8, the surface cleaning device 20 may include a first cleaning body 22, where the first cleaning body 22 consists of a second housing, a cover, a waste collection mechanism, and a power integration module 24. The second housing defines a receiving chamber, while the cover is positioned at the opening of the receiving chamber and is movably connected to the second housing. The waste collection mechanism can be arranged inside the receiving chamber of the second housing and is detachably connected to the second housing. The power integration module 24 is to control the movement of the surface cleaning device 20 on the surface of the pool water.

For example, the waste collection mechanism may include a waste collection box and a filtration mechanism. The waste collection box is positioned within the receiving chamber of the second housing and includes an inlet and an outlet. The inlet of the waste collection box can be connected to the external environment, and the outlet of the waste collection box can be connected to the external environment. The filtration mechanism is arranged at the outlet of the waste collection box. During the operation of the surface cleaning device 20, water from the pool can enter the waste collection mechanism through the inlet, pass through the filtration mechanism, and then exit through the outlet. This process collects floating debris from the pool surface into the waste collection box. After the surface cleaning device 20 has completed its cleaning task, the waste collection box can be removed for easy disposal of the collected debris.

In one embodiment, as shown in FIG. 8, the power integration module 24 may include a propeller 241, a first control module 242, and a first power integration module 243. The first control module 242 is electrically connected to both the propeller 241 (also referred to as the hull propeller) and the communication device 23. The first power integration module 243 is electrically connected to both the propeller 241 and the first control module 242 to supply power to them. The first control module 242 is connected to the communication device 23 via the connecting cable 21.

In one embodiment, the first control module 242 could be a printed circuit board (PCB). The power integration module 24 may include either a single propeller or multiple propellers.

Figure 9:
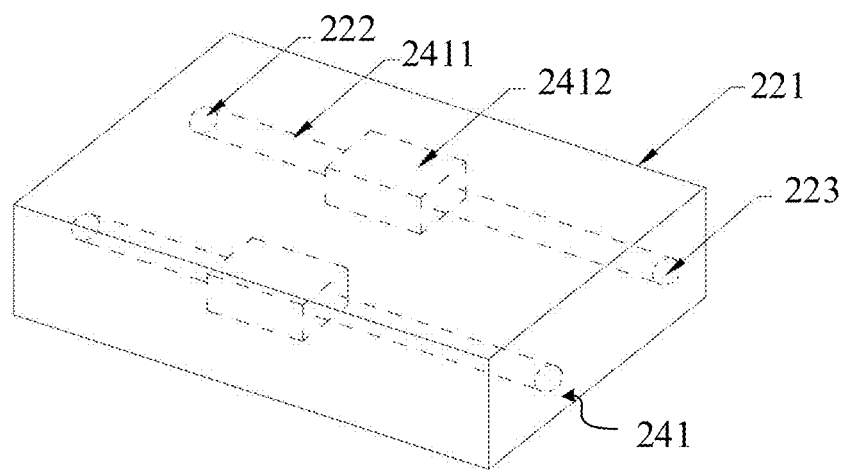
FIG. 9 is a schematic diagram of a propeller according to one embodiment.

In one embodiment, as shown in FIG. 9, the second housing 221 includes a first side and a second side. The first side defines an inlet 222, and the second side defines an outlet 223. The propeller 241 includes a drainage pipe 2411 that connects the inlet 222 and the outlet 223, and a pump motor 2412 mounted on the drainage pipe 2411. The pump motor 2412 is to draw water from outside the surface cleaning device 20 through the inlet 222 and discharge it through the outlet 223. The first side and second side can be two opposite sides of the second housing 221, such as the front and back sides. Alternatively, the first side and second side can be two adjacent sides, such as the bottom and a side of the second housing 221. If the second side is the bottom, the inlet 222 is located on the first side and away from the second side. In one embodiment, when the propeller 241 operates, the pump motor 2412 draws water from the front of the surface cleaning device 20 through the inlet 222 and discharges it through the outlet 223 at the rear of the device. This creates a reactive force from the expelled water, propelling the surface cleaning device 20 forward.

Figure 10:
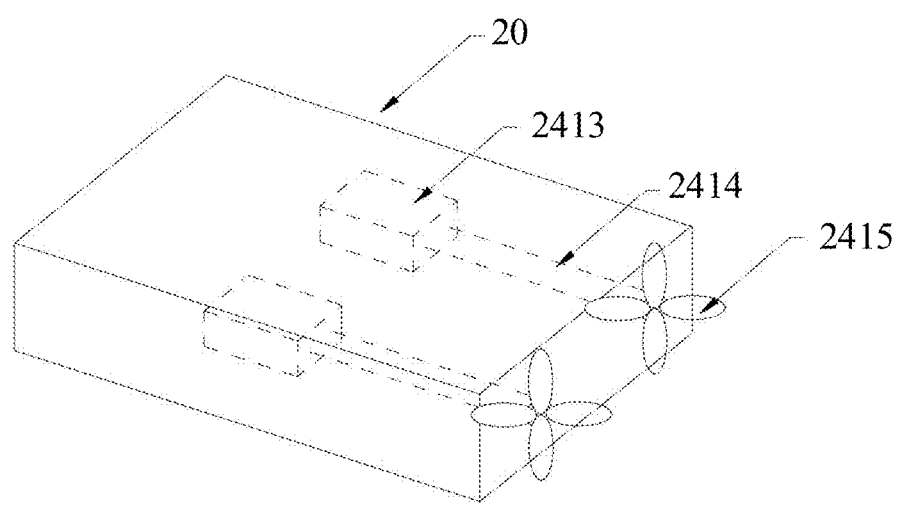
FIG. 10 is a schematic diagram of a propeller according to another embodiment.

In one embodiment, as shown in FIG. 10, the propeller 241 may include a drive motor 2413, a motor shaft 2414, and a propeller 2415. The drive motor 2413 is located inside the second housing 221, and the propeller 2415 is mounted on the rear side of the second housing 221 (i.e., the rear side of the surface cleaning device 20). The propeller 2415 is connected to the drive motor 2413 via the motor shaft 2414, allowing the drive motor 2413 to drive the propeller 2415 to rotate and thereby propel the surface cleaning device 20 forward.

In one embodiment, the surface cleaning device 20 has a dedicated propeller 241. When the pool cleaning robot 10 and the surface cleaning device 20 work together, the propeller 241 can propel the surface cleaning device 20 forward. This, in turn, allows the pool cleaning robot 10 to help move the surface cleaning device 20, reducing the power consumption of the pool cleaning robot 10 and extending its operational time. Furthermore, when the surface cleaning device 20 operates independently, the propeller 241 provides the necessary power, allowing the surface cleaning device 20 to clean the water surface effectively.

In one embodiment, the pool cleaning system may include a charging station. The charging station can charge both the pool cleaning robot 10 and the surface cleaning device 20.

Figure 11:
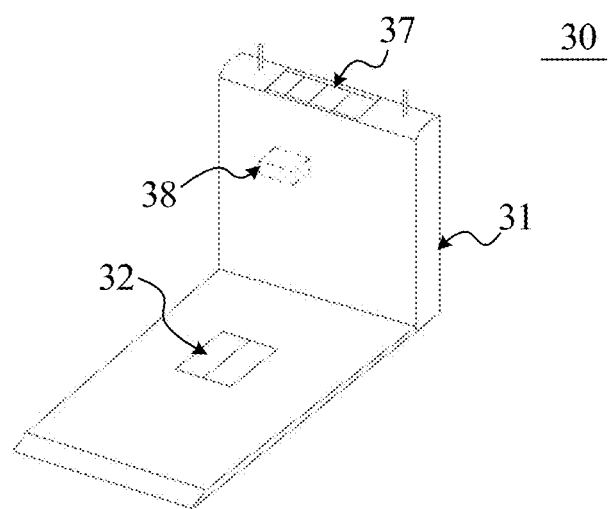
FIG. 11 is a schematic diagram of a charging station according to one embodiment.

In one embodiment, the charging station can directly charge the pool cleaning robot 10. For instance, as shown in FIG. 11, the charging station 30 includes a charging base 31 with a first charging interface 32. The pool cleaning robot 10 is equipped with a second charging interface (not shown) corresponding to the first charging interface 32. When the pool cleaning robot 10 returns to the charging station 30, the second charging interface connects with the first charging interface 32, allowing the charging station 30 to charge the pool cleaning robot.

In one embodiment, the charging station can charge the surface cleaning device 20 and, through the connecting cable 21, charge the pool cleaning robot 10. The connecting cable 21 may include at least one second interface, with the at least one second interface serving as a power interface, and the at least one second interface can be used to charge the pool cleaning robot 10.

Figure 12:
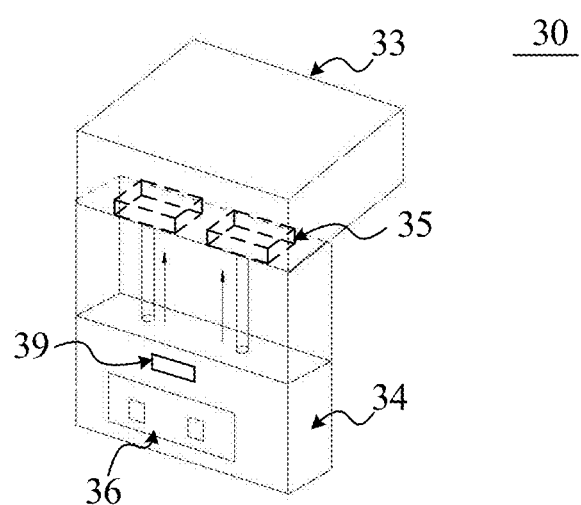
FIG. 12 is a schematic diagram of a charging station according to another embodiment.
Figure 13:
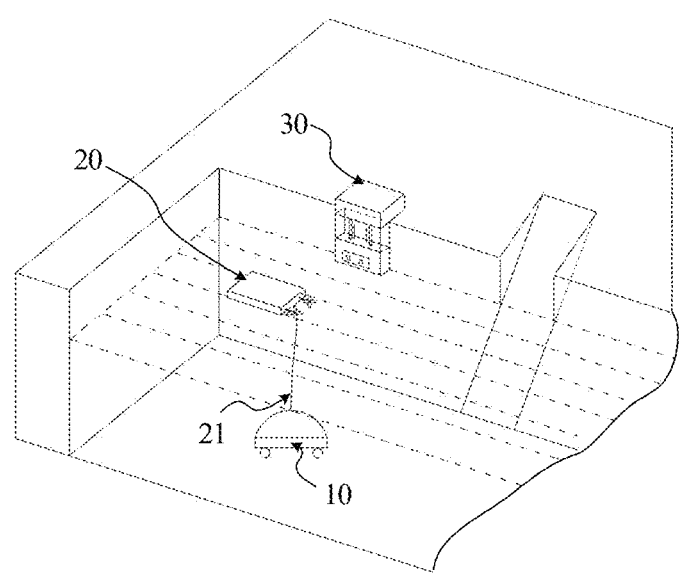
FIG. 13 is the schematic diagrams of a second application scenarios of the swimming pool cleaning system.

For example, as shown in FIG. 12, the charging station 30 includes a support base 33 and a charging unit 34. Inside the support base 33, there is a lifting mechanism 35 connected to the charging unit 34. The lifting mechanism 35 is to control the vertical movement of the charging unit 34, allowing it to move closer to or further away from the support base 33. The charging unit 34 is equipped with a third charging interface 36. As illustrated in FIG. 13, when the charging station 30 is arranged on the side of the pool, the charging unit 34 can be located within the pool. The lifting mechanism 35 can lower the charging unit 34 to bring it closer to the water surface, thus avoiding a situation where the charging unit 34 is too far from the water surface, preventing the surface cleaning device 20 from connecting to the charging station 30.

For example, as shown in FIG. 12, the lifting mechanism 35 includes a screw motor and a connecting shaft. The screw motor is connected to the charging unit 34 via the connecting shaft, allowing the screw motor to control the vertical movement of the charging unit 34, bringing it closer to or further away from the support base 33.

In one embodiment, as shown in FIG. 12, the charging station 30 can further include a transmitter 39. The transmitter 39 is mounted on the charging unit 34 and is designed to match with a receiver (not shown) installed on the surface cleaning device 20.

Specifically, the charging unit 34 is equipped with a third charging interface 36, and the surface cleaning device 20 has a fourth charging interface (not shown). In response to a charging command, the transmitter 39 on the charging station 30 emits a signal, and the receiver on the surface cleaning device 20 receives the signal emitted by the transmitter 39. Once the surface cleaning device 20 receives the signal from the transmitter 39, it determines the position of the charging station 30 based on the signal and moves towards the charging station 30 accordingly. When the surface cleaning device 20 reaches the charging unit 34 of the charging station 30, the fourth charging interface of the surface cleaning device 20 connects with the third charging interface 36 of the charging unit 34. Consequently, the charging station 30 can charge the surface cleaning device 20, and the surface cleaning device 20 can charge the pool cleaning robot 10 via the connecting line 21. Thus, the charging station 30 provides power to the pool cleaning robot 10 through the surface cleaning device 20 and the connecting cable 21.

As discussed above, this charging station 30 can charge both the pool cleaning robot 10 and the surface cleaning device 20, meeting their power needs. Additionally, when the pool cleaning robot 10 has low battery, it can return to the charging station 30 to recharge. Alternatively, the pool cleaning robot 10 can use the surface cleaning device 20 as a power source, allowing it to be powered while continuing its cleaning tasks without interrupting its work, thus improving cleaning efficiency. Furthermore, if the pool cleaning robot 10 runs low on battery during a cleaning task, it can control the surface cleaning device 20 to return to the shore-based charging station 30. The charging station 30 can then charge the surface cleaning device 20, which, in turn, can provide power to the pool cleaning robot 10 via the connecting cable 21. This configuration eliminates the need for the pool cleaning robot 10 to leave the water for recharging, allowing it to resume its cleaning tasks once its battery is sufficiently charged, saving time and further enhancing cleaning efficiency.

In one embodiment, the charging station 30 can function as an external control device, allowing users to control the operation of both the pool cleaning robot 10 and the surface cleaning device 20 through the charging station 30.

In some examples, as shown in FIG. 11, the charging station 30 may further include a touch module 37. The touch module 37 can receive user input and, in response to the user input, generate control commands. It can then send these control commands to the pool cleaning robot 10 via the surface cleaning device 20, enabling the pool cleaning robot 10 to perform the corresponding actions as instructed.

Specifically, the touch module 37 may include a control panel. The control panel can feature various controls, such as cleaning controls and charging controls. Upon receiving user input (e.g., pressing or clicking) on the cleaning control, the module generates cleaning commands in response to the user input. These cleaning commands may include a first cleaning command and a second cleaning command. The first cleaning command is to control the pool cleaning robot 10 to clean the pool's floor and walls. The second cleaning command is to control the surface cleaning device 20 to clean the pool's water surface.

When generating the first cleaning command, the first cleaning command is sent to the surface cleaning device 20 via the communication device 23. Upon receiving the first cleaning command, the surface cleaning device 20 then forwards the first cleaning command to the pool cleaning robot 10. Once the pool cleaning robot 10 receives the first cleaning command, it performs the corresponding actions as specified by the command. This allows the pool cleaning robot 10 to clean the pool's floor and walls according to the first cleaning command, clean a target area on the pool's floor, or clean a specific pool wall as directed by the command.

When generating the second cleaning command, the second cleaning command is sent to the surface cleaning device 20 via the communication device 23. Upon receiving the second cleaning command, the surface cleaning device 20 executes the corresponding actions as specified by the command. This allows the surface cleaning device 20 to clean the pool's water surface according to the second cleaning command, or to clean a specific target area on the water surface as directed by the command.

In this embodiment, users can control the pool cleaning robot 10 and the surface cleaning device 20 through the charging station 30, which offers convenient operation and an enhanced user experience.

In one embodiment, as shown in FIG. 11, the charging station 30 can further include a voice module 38. The voice module 38 is designed to receive voice commands from the user, which can include a first voice command and a second voice command. The first voice command is to control the pool cleaning robot 10 to clean the pool's floor and walls. The second voice command is to control the surface cleaning device 20 to clean the pool's water surface. When the voice module 38 receives the first voice command, it generates corresponding control commands based on the first voice command. These control commands are sent to the surface cleaning device 20 via the communication device 23. Upon receiving these commands, the surface cleaning device 20 sends the appropriate control commands to the pool cleaning robot 10, enabling the pool cleaning robot 10 to perform the specified actions and clean the pool's floor and walls.

When the voice module 38 receives the second voice command, it generates corresponding control commands based on the second voice command. These control commands are sent to the surface cleaning device 20 via the communication device 23. As a result, the surface cleaning device 20 executes the actions according to the control commands and cleans the pool's water surface.

In the embodiment, the charging station 30 is equipped with the voice module, allowing users to control the pool cleaning robot 10 and the surface cleaning device 20 using voice commands. This makes operation more convenient and improves user experience.

In one embodiment, the pool cleaning robot 10 can send its operational information to the surface cleaning device 20 (i.e., communication device 23) via the connecting cable 21. Upon receiving the operational information from the pool cleaning robot 10, the surface cleaning device 20 (i.e., communication device 23) forwards this information to an external control device. This allows the external control device to assess whether the pool cleaning robot 10 has encountered a specific event based on its operational information. If a target event occurs, the external control device will issue a first notification to alert users about the event involving the pool cleaning robot.

In this context, the operational information of the pool cleaning robot 10 may include its location information and battery status information. Target events can include situations where the pool cleaning robot 10 is stuck by an obstacle or when the battery level of the pool cleaning robot 10 drops below a preset threshold, indicating insufficient battery power. The first notification can be in the form of a voice alert, text message, or other types of notifications. The specific type and content of the first notification are not limited in this embodiment.

For example, if the external control device is the charging station, during the operation of the pool cleaning robot 10, the robot sends its operational information to the surface cleaning device 20 (i.e., the communication device 23) via the connecting cable. Upon receiving this operational information, the surface cleaning device 20 (i.e., the communication device 23) forwards it to the charging station 30. The charging station 30 then uses the location information of the pool cleaning robot 10 to determine if the robot is stuck by an obstacle. If the charging station 30 confirms that the pool cleaning robot 10 is obstructed, it will use the voice module to issue a voice alert (i.e., the first notification) to inform the user, prompting him/her to take action to help the robot navigate around the obstacle.

Figure 14:
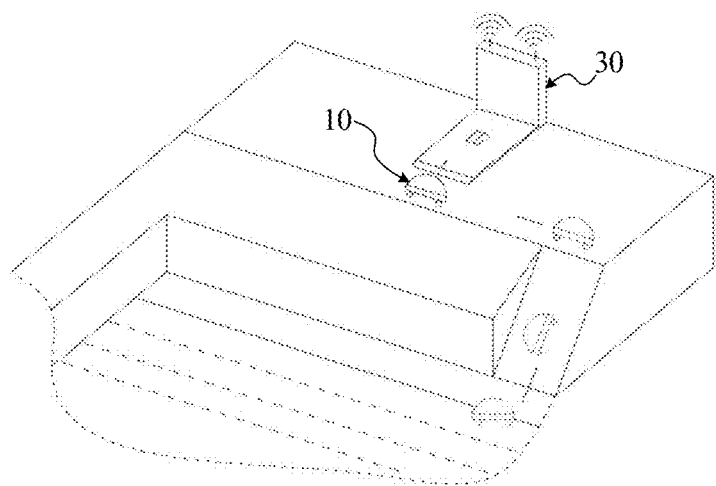
FIG. 14 is the schematic diagrams of a third application scenarios of the swimming pool cleaning system.

In one embodiment, the charging station 30 monitors the battery level information of the pool cleaning robot 10 to determine if the battery is below a preset threshold (i.e., if the pool cleaning robot 10 is low on power). If the charging station 30 confirms that the battery level is below the preset threshold, it will use the voice module to issue a voice alert (i.e., the first notification) to prompt the user to charge the pool cleaning robot 10. At this point, the charging station 30 can send a charging command to the pool cleaning robot 10 through the communication device 23. Upon receiving the charging command, the pool cleaning robot 10 sends a first electrical signal to the electrical connector 17, causing the robot to disconnect from the connecting cable 21. With the pool cleaning robot 10 disconnected from the connection line 21, it will generate a return path based on its current location and the location of the charging station 30, as shown in FIG. 14, and move along this path to the charging station 30 to recharge.

In the embodiment, during the operation of the pool cleaning robot 10, it can send its operational information to an external control device, allowing the external control device to monitor the working status of the pool cleaning robot 10. When the external control device determines that a target event has occurred based on the operational information of the pool cleaning robot 10, it can issue a first notification. This allows the user to intervene in the operation of the pool cleaning robot 10 to prevent damage from collisions with obstacles and to avoid the pool cleaning robot 10 running out of power and being unable to move itself onto the shore.

Figure 15:
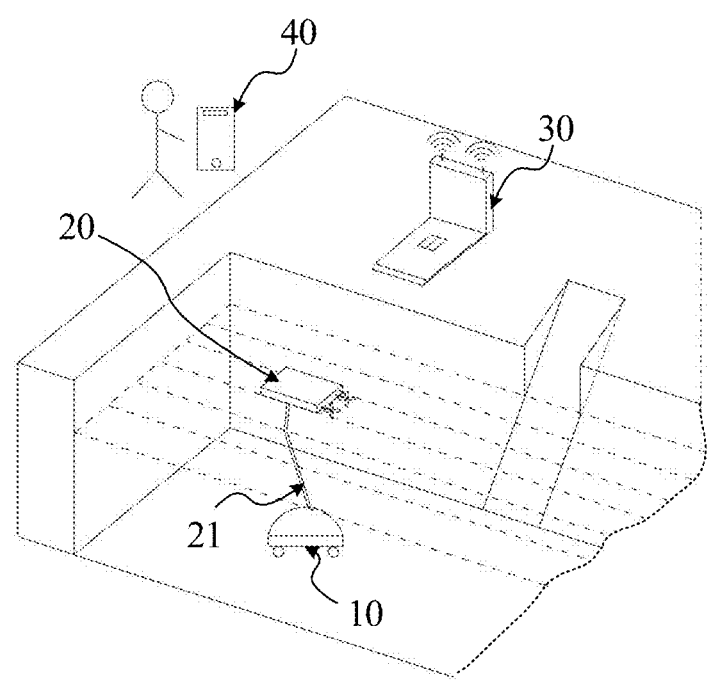
FIG. 15 is the schematic diagrams of a fourth application scenarios of the swimming pool cleaning system.

In one embodiment, as shown in FIG. 15, the external communication device can be a terminal device 40, allowing the user to control the pool cleaning robot 10 and the water surface cleaning device 20 through the terminal device 40. Specifically, the terminal device 40 can receive user inputs and, in response to these inputs, generate corresponding control instructions. When the control instruction is a first cleaning instruction, the terminal device 40 sends the first cleaning instruction to the water surface cleaning device 20 via the communication device 23. After receiving the first cleaning instruction, the water surface cleaning device 20 sends the same instruction to the pool cleaning robot 10. Upon receiving the first cleaning instruction, the pool cleaning robot 10 performs the corresponding actions. Optionally, the user's inputs can be voice commands given by the user.

When the control instruction is a second cleaning instruction, the terminal device 40 sends the second cleaning instruction to the water surface cleaning device 20 via the communication device 23. After receiving the second cleaning instruction, the water surface cleaning device 20 performs the corresponding actions according to the second cleaning instruction.

When the control instruction is a charging instruction, the terminal device 40 sends the charging instruction to the water surface cleaning device 20 via the communication device 23. After receiving the charging instruction, the water surface cleaning device 20 sends a charging instruction to the pool cleaning robot 10. Upon receiving the charging instruction, the pool cleaning robot 10 sends a first electrical signal to the electrical connector 17, causing the pool cleaning robot 10 to disconnect from the connecting cable 21. Once disconnected from the connection line 21, the pool cleaning robot 10 moves along the return path to the charging station 30 to charge.

As discussed above, the external control device can be either the terminal device 40 or the charging station 30. This allows users to choose the appropriate external control device based on their actual usage scenario, making it convenient to control the pool cleaning robot 10 and the surface cleaning device 20, thereby enhancing user experience and ease of operation.

Figure 16:
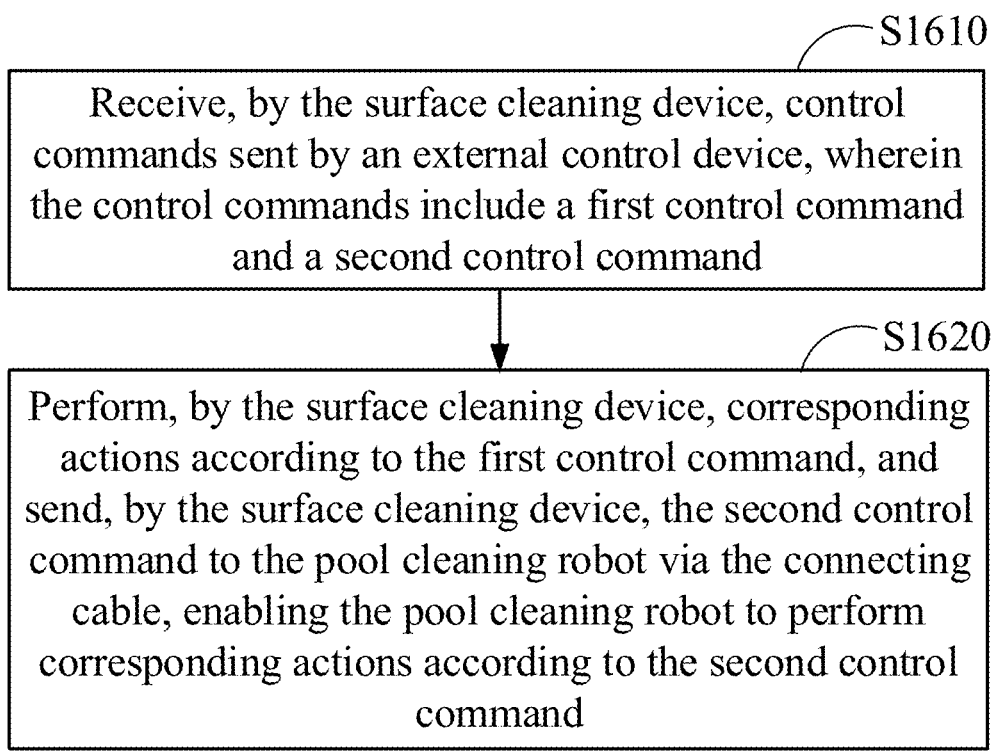
FIG. 16 is an exemplary flowchart of a control method of the swimming pool cleaning system according to one embodiment.

The present disclosure further provides a control method for a pool cleaning system. This control method is applied to the pool cleaning system described in the previous embodiments. The control method for the pool cleaning system is schematically described as follows. Referring to FIG. 16, the control method for the pool cleaning system may include the following steps.

In step S1610, the surface cleaning device receives control commands sent by the external control device. The control commands include the first control command and the second control command. The first control command is to control the surface cleaning device to clean the pool's surface. The second control command is to control the pool cleaning robot to clean the pool's floor and walls.

For example, the external control device could be a terminal device or a charging station. When the external control device is a charging station, the control command could be a command generated by the charging station in response to the user's input. The control command could be a command generated by the charging station based on the user's voice command input. When the external control device is a terminal device, the control command could be a command generated by the terminal device in response to the user's input. The control command could be a command generated by the terminal device based on the user's voice command input.

In step s1620, the surface cleaning device performs the corresponding actions according to the first control command, the surface cleaning device sends the second control command to the pool cleaning robot via the connection cable, so that the pool cleaning robot performs the corresponding actions according to the second control command.

Specifically, when the control command is the first control command, the external control device sends the first control command to the surface cleaning device via the communication device. The surface cleaning device receives the first control command and performs the corresponding actions according to the first control command.

When the control command is the second control command, the external control device sends the second control command to the surface cleaning device via the communication device. After receiving the second control command, the surface cleaning device sends it to the pool cleaning robot. Upon receiving the second control command, the pool cleaning robot performs the corresponding actions according to the second control command.

In one embodiment, the control command may include a charging command. When the pool cleaning robot receives the charging command, it sends a first electrical signal to the electrical connector, causing the pool cleaning robot to disconnect from the connecting cable and return to the charging station for charging.

Specifically, when the control command is a charging command, the external control device sends the charging command to the surface cleaning device via the communication device. After receiving the charging command, the surface cleaning device sends the charging command to the pool cleaning robot. Upon receiving the charging command, the pool cleaning robot sends a first electrical signal to the electrical connector, causing it to disconnect from the connecting cable. Once disconnected, the pool cleaning robot moves along the return path to the charging station for recharging.

In one embodiment, the control method of the pool cleaning system may further include: the pool cleaning robot sends its operational information to the external control device via the surface cleaning device. When the operational information indicates that a target event has occurred with the pool cleaning robot, the external control device outputs a first notification message, which is to inform the user that a target event has occurred with the pool cleaning robot.

The operational information of the pool cleaning robot may include its location and battery status. Target events may include the pool cleaning robot being stuck by an obstacle or the pool cleaning robot's battery being below a preset level, indicating low battery. The first notification message may be a voice notification or a text notification. The type and content of the first notification message are not limited by the present disclosure.

Specifically, during the operation of the pool cleaning robot, the robot sends its operational information to the surface cleaning device (i.e., the communication device) via the connecting cable. After receiving the operational information from the pool cleaning robot, the surface cleaning device (i.e., the communication device) sends the operational information to the external control device. The external control device then uses the location information of the pool cleaning robot to determine if the robot is stuck by an obstacle. If the external control device determines that the pool cleaning robot is stuck, it will output the first notification message (such as a voice notification) to inform the user to intervene, thereby helping the pool cleaning robot bypass the obstacle.

The external control device, based on the pool cleaning robot's battery information, determines whether the robot's battery level is below the preset threshold (i.e., whether the robot is running low on power). If the external control device confirms that the robot's battery is below the preset threshold, it outputs the first notification message (such as a voice notification) to inform the user to charge the pool cleaning robot. At this point, the external control device can send a charging command to the pool cleaning robot via the communication device. Upon receiving the charging command, the pool cleaning robot sends a first electrical signal to the electric connector, causing the robot to disconnect from the connecting cable. Once the robot is disconnected, as illustrated in FIG. 14, it generates a return path based on its current location and the charging station's location and moves along this path to the charging station for recharging.

As discussed above, during the operation of the pool cleaning robot, the robot can send its operational information to the external control device, allowing the external control device to monitor the robot's working status. When the external control device determines that the pool cleaning robot has encountered a target event based on the operational information, it can output a first notification message. This helps alert the user to intervene in the robot's operation, preventing damage from collisions with obstacles and avoiding the robot running out of power and being unable to move to the shore on its own.

It should be understood that sequence numbers of the foregoing processes do not mean an execution sequence in the above-mentioned embodiments. The execution sequence of the processes should be determined according to functions and internal logic of the processes, and should not be construed as any limitation on the implementation processes of the above-mentioned embodiments.

As discussed above, the pool cleaning robot is connected to the surface cleaning device via a cable, allowing the robot to communicate with the external control device through the surface cleaning device. This configuration helps avoid severe signal attenuation during wireless communication, ensuring stable communication between the pool cleaning robot and the external control device. It prevents delays in the robot's response to commands from the external control device, thereby enhancing the robot's response speed. Moreover, since the pool cleaning robot and the surface cleaning device are connected via a cable, the robot can serve as a power source for the surface cleaning device during the cleaning process. This arrangement meets both the surface cleaning needs and the cleaning needs for the pool's floor and walls, improving the overall efficiency of the pool cleaning system and reducing cleaning time.

The present disclosure further provides a control device for a pool cleaning system. The control device for the pool cleaning system includes a processor, a storage, and a computer program stored in the storage that can run on the processor. When the processor executes the computer program, it performs the steps of the various method embodiments described above.

The present disclosure further provides a computer-readable storage medium, which stores a computer program that, when executed by a processor, implements the steps of the various method embodiments described above.

The present disclosure further provides a computer program product that, when executed on a control device/ terminal device, enables the control device/terminal device to perform the steps of the various method embodiments described above.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

In the embodiments above, the description of each embodiment has its own emphasis. For parts that are not detailed or described in one embodiment, reference may be made to related descriptions of other embodiments.

Those skilled in the art will recognize that the units and algorithm steps described in the examples combined with the embodiments disclosed herein can be implemented in electronic hardware, or in a combination of computer software and electronic hardware. Whether these functions are executed through hardware or software depends on the specific application and design constraints of the technical solution. Professionals can use different methods to implement the described functions for each specific application, but such implementations should not be considered beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A swimming pool cleaning system, comprising:
 a pool cleaning robot (10) configured to clean at least a floor and pool walls of a swimming pool; and
 a surface cleaning device (20) configured to clean at least a pool surface of the swimming pool;
 wherein the surface cleaning device (20) is wirelessly connectable to an external control device and comprises a connecting cable (21) that electrically connects the surface cleaning device (20) to the pool cleaning robot (10), so that the pool cleaning robot (10) communicates with the external control device via the surface cleaning device (20).

2. The swimming pool cleaning system of claim 1, wherein the surface cleaning device (20) further comprises a first cleaning body (22) and a communication device (23), the communication device (23) is detachably connected to the first cleaning body (22), the connecting cable (21) is electrically connected to the communication device (23) and the pool cleaning robot (10).

3. The swimming pool cleaning system of claim 2, wherein the communication device (23) comprises a first housing (231) and a communication module (232), the first housing (231) is floatable on the pool surface, the communication module (232) is installed inside the first housing (231) and wirelessly connected to the external control device, the connecting cable (21) comprises a first end connected to the communication module (232), and a second end that extends out of the first housing (231) and is connected to the pool cleaning robot (10).

4. The swimming pool cleaning system of claim 1, wherein the pool cleaning robot (10) comprises an electrical connector (17), the pool cleaning robot (10) is connected to the connecting cable (21) via the electrical connector (17), the electrical connector (17) is configured to receive an input signal to connect the pool cleaning robot (10) to or disconnect the pool cleaning robot (10) from the connecting cable (21).

5. The swimming pool cleaning system of claim 2, wherein the first cleaning body (22) comprises a second housing (221), a waste collection mechanism and a power integration module (24), the waste collection mechanism is arranged within the second housing (221) and is detachably connected to the second housing (221), the power integration module (24) is received in the second housing (221) and comprises a propeller (241), a first control module (242) and first power module (243), the first control module (242) is electrically connected to both the propeller (241) and the communication device (23), the first power module (243) is electrically connected to both the propeller (241) and the first control module (242) to provide power to the propeller (241) and the first control module (242).

6. The swimming pool cleaning system of claim 5, wherein the second housing (221) comprises a first side and a second side, with a water inlet (222) located on the first side and a water outlet (223) located on the second side; the propeller (241) comprises a drainage pipe (2411) connecting the water inlet (222) and the water outlet (223), and a water pump motor (2412) installed on the drainage pipe (2411), the water pump motor (2412) is configured to draw water from outside the surface cleaning device (20) through the water inlet (222) and discharge the water through the water outlet (223).

7. The swimming pool cleaning system of claim 1, further comprising a charging station (30), wherein the charging station (30) comprises a touch module (37), the touch module (37) is configured to respond to user input operations, generate control commands, and send the control commands to the pool cleaning robot (10) through the surface cleaning device (20), enabling the pool cleaning robot (10) to perform corresponding actions according to the control commands.

8. The swimming pool cleaning system of claim 7, wherein the charging station (30) further comprises a voice module (38), the voice module (38) is configured to receive voice commands from a user, generate the control commands based on the voice commands, and send the control commands to the pool cleaning robot (10) through the surface cleaning device (20), enabling the pool cleaning robot (10) to perform corresponding actions according to the control commands; the voice module (38) is further configured to issue a first alert message when a target event occurs with the pool cleaning robot (10), the first alert message is configured to notify the user of occurrence of the target event with the pool cleaning robot (10).

9. The swimming pool cleaning system of claim 7, wherein the charging station (30) comprises a charging base (31) having a first charging interface (32), the pool cleaning robot (10) comprises a second charging interface, the second charging interface is configured to connect with the first charging interface (32) when the pool cleaning robot (10) returns to the charging station (30), allowing the charging station (30) to charge the pool cleaning robot (10).

10. The swimming pool cleaning system of claim 7, wherein the charging station (30) comprises a support base (33) and a charging unit (34), the support base (33) comprises a lifting mechanism (35) therein, the charging unit (34) is connected to the lifting mechanism (35), the lifting mechanism (35) is configured to control the charging unit (34) to move up and down, so that the charging unit (34) approaches or moves away from the support base (33), the charging unit (34) comprises a third charging interface (36); the surface cleaning device (20) comprises a fourth charging interface, when the fourth charging interface of the surface cleaning device (20) connects to the third charging interface (36), the charging station (30) charges the surface cleaning device (20), and the charging station (30) is configured to charge the pool cleaning robot (10) through the surface cleaning device (20) and the connecting cable (21).

11. A control method for a pool cleaning system that comprises a pool cleaning robot, a surface cleaning device and a connecting cable that electrically connect the pool cleaning robot to the surface cleaning device, the method comprising:
receiving, by the surface cleaning device, control commands sent by an external control device, wherein the control commands comprise a first control command and a second control command;
performing, by the surface cleaning device, corresponding actions according to the first control command, and sending, by the surface cleaning device, the second control command to the pool cleaning robot via the connecting cable, enabling the pool cleaning robot to perform corresponding actions according to the second control command.

12. The method of claim 11, wherein the pool cleaning system comprises a charging station, and the second control command is a charging command, the pool cleaning robot comprises an electrical connector, and the method further comprises:
in response to the pool cleaning robot receiving the charging command, sending, by the pool cleaning robot, a first electrical signal to the electrical connector, causing the pool cleaning robot to disconnect from the connecting cable and return to the charging station for charging.

13. The method of claim 11, further comprising:
sending, by the pool cleaning robot, operational information of the pool cleaning robot to the external control device via the surface cleaning device; and
in response to the operational information indicating that a target event has occurred with the pool cleaning robot, outputting, by the external control device, a first alert message, where the first alert message is configured to notify that the target event has occurred with the pool cleaning robot.

* * * * *